United States Patent [19]
Rothe

[11] 4,204,523
[45] May 27, 1980

[54] MOUNT FOR SOLAR COLLECTORS

[75] Inventor: Eva Rothe, Bamberg, Fed. Rep. of Germany

[73] Assignee: E. Cacarda GmbH, Bamberg, Fed. Rep. of Germany

[21] Appl. No.: 832,763

[22] Filed: Sep. 12, 1977

[30] Foreign Application Priority Data

Sep. 11, 1976 [DE] Fed. Rep. of Germany ....... 2641073

[51] Int. Cl.² .............................................. F24J 3/02
[52] U.S. Cl. ....................................... 126/450; 52/27
[58] Field of Search ...................... 126/270, 271, 450; 52/173 R, 553, 27; 237/1 A; 165/47

[56] References Cited

U.S. PATENT DOCUMENTS

| | | | |
|---|---|---|---|
| 3,710,520 | 1/1973 | Federowicz | 52/27 |
| 3,742,659 | 7/1973 | Drew | 52/27 X |
| 3,893,506 | 7/1975 | Laing | 237/1 A |
| 3,980,071 | 9/1976 | Barber, Jr. | 126/271 |
| 4,055,163 | 10/1977 | Costello et al. | 126/271 |
| 4,074,705 | 2/1978 | Robinson, Jr. et al. | 237/1 A |
| 4,083,360 | 4/1978 | Courvoisier et al. | 126/270 X |

OTHER PUBLICATIONS

Alustar, Solaranlagen, Aluminium, Vereinigte Metallwerke, Ranshofen-Berndorf AG, Mar. 1976.

*Primary Examiner*—James C. Yeung
*Assistant Examiner*—Larry Jones
*Attorney, Agent, or Firm*—Allison C. Collard; Thomas M. Galgano

[57] ABSTRACT

A support for mounting solar energy collectors on a roof of a building, which roof has an opening in the roof sheeting, includes a shell having a generally flat rectangular base and an upstanding edge secured to, and extending about the periphery of the base and a frame secured to, and extending about, the periphery of the shell. The frame is configured and dimensional to correspond to the outer surface shape of the roof sheeting and to permit mating receipt thereof in the opening of the sheeting.

10 Claims, 4 Drawing Figures

U.S. Patent May 27, 1980 4,204,523
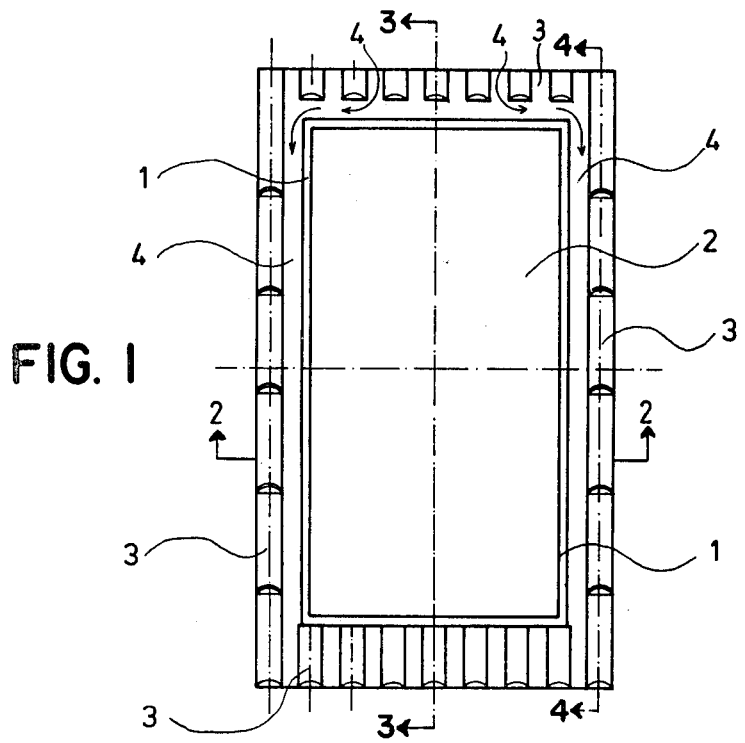
FIG. 1
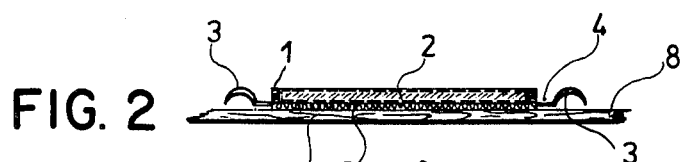
FIG. 2
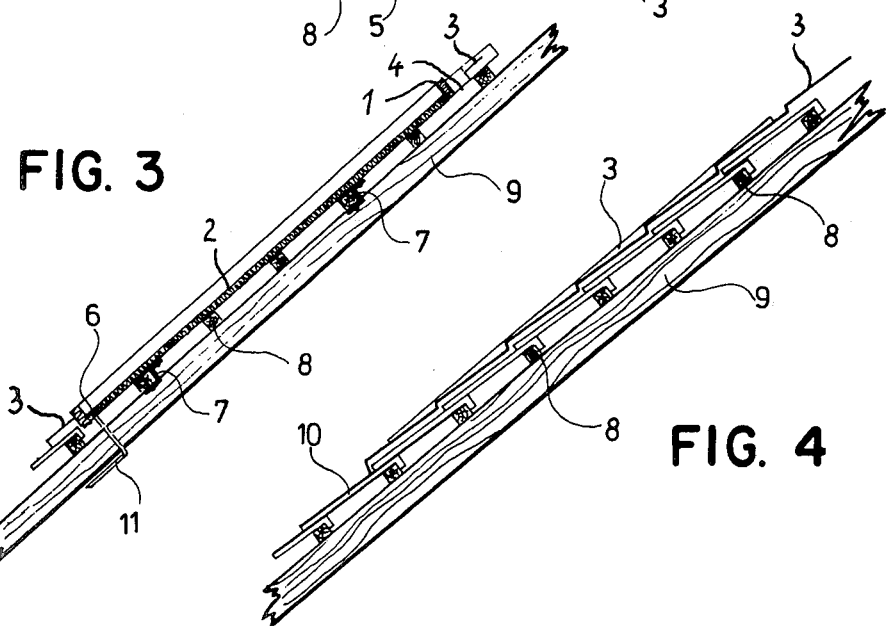
FIG. 3
FIG. 4

MOUNT FOR SOLAR COLLECTORS

The invention relates to a support for mounting solar energy collectors on a building roof.

Presently there is renewed interest in harnessing solar energy, in particular, for heating purposes, and a number of so-called solar energy collectors have been developed which are mounted on building roofs and the solar energy is collected and converted into a practically usable form of energy. Within the meaning of the term "solar energy collector" is to be understood to mean each suitable device in a plate-like structure, which may be mounted on a building roof for the purpose of collecting and utilizing solar energy.

For example, such collectors may be in the form of flat liquid containers through which a suitable liquid is fed and heated, due to the solar energy and is then used in the form of heating water or for heating purposes within the building. The collectors may also be of the type having photoelectric elements like, for example, silicon elements through which the solar energy is converted into electrical energy.

All of the known collectors have a flat structure, but different sizes and efficiency. Also, the roof sheetings of the buildings onto which the collectors are to be mounted are different. The roof sheeting may consist, for example, of commonly used roof tiles, corrugated asbesto-cement plates, slate or also of flat folding profiles.

The problem exists in mounting the different solar energy collectors on roofs having a different roof sheeting.

Hitherto, the solar energy collectors were mounted on building roofs in different ways. For example, such collectors are mounted above the unchanged roof sheeting. This requires the use of additional support and mounting elements which must be able to support the weight of the collectors in all weather conditions. Such a mounting requires high expenditures of energy and therefore high costs, and also does not offer a nice appearance.

In a different method of mounting the collectors on building roofs, the mounting supports must be fitted into the roof sheeting at the site, and must be connected therewith in a weatherproof manner. For this purpose, a part of the roof sheeting must be removed and the tight fitting of the collectors into the roof sheeting must be carried out under time and work-consuming circumstances. This work can only be carried out by an expert.

One has already mounted such collectors between the rafters, after removing the roof tiles and removing the square laths, whereby the same are covered with light-permeable tiles, for example, plastic tiles. This type of mounting also requires a lot of work and consumption of time for sealing against rain water.

It is an object of the invention to provide a mounting support for solar energy collectors, which may be mounted in a simple manner by eliminating any changes in the roof construction, and which are suitable for receiving any type of solar energy collectors. Thus, the installation of the mounting support should be so simple that trained personnel can mount the same on any type of roof.

This object is obtained by the provision of a mounting support of the aforementioned type, which consists of a flat, rectangular shell surrounded by a frame which is three-dimensionally adapted to the roof sheeting.

Such a shell-like mounting support can be easily inserted into an existing roof sheeting, without requiring large conversions or expensive mounting means. Furthermore, an additional sealing with respect to the roof sheeting is not required.

In accordance with an advantageous embodiment of the invention, a smooth water drainage chute is provided at least on the two longitudinal sides between shell edge and shell bottom, which deflects the rain water in such a way that it cannot accumulate above the collector.

Preferably, the shell is lined with a heat insulating material for which foam plastic is particularly suitable, for example, polyurethane hard foam.

Advantageously, the shell is also lined with a heat reflecting material, for which, in particular, aluminum foil is suitable.

Essentially, simple mounting means are provided on the lower side of the shell, for example, in form of Z-like brackets, with which the shell can be mounted on the square laths in a simple manner.

The shell bottom may be provided with sealable perforations, which serve as openings for lines, for example, pipe lines or electrical lines.

The shell and the frame preferably consist of plastic material, for example, glass fiber-strengthened polyester resin.

Further embodiments of the invention are described in the following, in conjunction with one embodiment shown in the drawing. In the drawing FIG. 1 shows a plan view of a mounting support in accordance with the invention;

FIG. 2 shows a section through the mounting support along sectional line 2—2 of FIG. 1;

FIG. 3 shows a section through mounting support in accordance with FIG. 1, along sectional line 3—3 and FIG. 4 shows a section along sectional line 4—4 of FIG. 1.

In accordance with FIG. 1, the mounting support consists of a flat, rectangular shell having a shell edge 1 and a shell bottom 2. This flat shell is surrounded by an outer frame 3, which in its shape is adapted to the shape of the roof sheeting. Thereby, outer frame 3 imitates the form of the often used roof tiles or any other type of roof sheeting, so that an even sealing off is obtained when inserted into the existing roof sheeting in a manner in which the roofing tiles seal off with each other. On both sides and also on the upper edge, smooth faces 4 in form of chutes are provided between the profile of the outer frame 3 and the shell edge 1 which serve as water drainage chutes. This prevents an accumulation of water above the shell or the collectors, respectively. The solar collectors are inserted into the shell. With suitable dimensions, an additional mounting is not necessary in most cases. The mounting support itself can be mounted in a simple way on the roof sheeting. For this purpose, the roof tiles are removed, corresponding to the height and the width of, for example, the shell measurements. Further structural changes are not required. The mounting support with the shell is then inserted into the created opening in the roof sheeting, whereby between the roof tiles and the frame of the mounting support, a good seal is obtained by choosing the correct and suitable roof profile. The shell itself is supported by roof laths 8, which also absorb the weight of the collectors.

From FIG. 4, it can be seen that outer frame 3 completely adapts to the form of the employed roof tiles 10.

FIG. 3 shows how the shell bottom 2 engages roof laths 8. As already mentioned, additional angle- or Z-shaped brackets 7 may be attached on shell bottom 2, which are pushed with their shanks behind roof laths 8, so that in this simple manner a completely safe mounting is provided for the mounting support. As shown in FIG. 3, shell bottom 2 may be provided with sealable apertures 6, through which a line 11 extends. The Z-brackets 7 may be fastened with nails or screws on roof laths 8 or additionally on rafters 9. At the inside, the shell is lined with a heat-insulating material, for example, polyurethane hard foam plates 5, which, in addition, may be provided with a heat reflecting layer which consists, for example, of aluminum foil. In this manner, a good use is obtained by the heat radiation by the collectors and any other heat loss is prevented. Preferably, the total mounting support consists of a unitary piece of polyester plastic material reinforced with glass fibers in a thickness of about 3 mm. In view of the invention, it is possible to mount any type of solar energy collectors on roofs of any type of roof sheeting in a simple way, without requiring a large amount of time and material for installation, as is required for example, when lead sealing, sealing with permanent elastic putty, or when attaching a special structure frame for the collectors.

I claim:

1. A support for mounting solar energy collectors upon the roof rafters or laths of a roof of a building, said support being matingly receivable in an opening in the roof covering material, comprising:

a shell having a generally flat, rectangular base and an upstanding edge secured to, and extending about the entire periphery of said base; and a frame secured to, and extending about, the entire periphery of said shell, generally normally to said upstanding edge and spaced below the uppermost portion of said edge, said frame being configured and dimensioned to correspond to the outer surface shape of the roof covering material and to permit mating receipt thereof in said opening of said roof covering material.

2. The support according to claim 1, wherein said frame has formed thereon a water drainage channel disposed adjacent and parallel to the longitudinal sides of said shell edge.

3. The support according to claim 1, wherein said shell is lined with a heat insulating material.

4. The support according to claim 3, wherein said heat insulating material is foam plastic material.

5. The support according to claim 1, wherein said shell is lined with a heat-reflecting material.

6. The support according to claim 5, wherein said heat-reflecting material is aluminum foil.

7. The support according to claim 1, additionally including fastening means secured to the underside of said shell for securing said support to roof laths and rafters.

8. The support according to claim 7, wherein said fastening means comprise generally Z-shaped brackets.

9. The support according to claim 8, wherein said shell base has sealable apertures formed therein.

10. The support according to claim 1 wherein said shell and frame comprises a one-piece, unitary construction fabricated from glass fiber-reinforced polyester resin.

* * * * *